(12) United States Patent
Ross et al.

(10) Patent No.: US 9,911,131 B1
(45) Date of Patent: Mar. 6, 2018

(54) METHOD AND SYSTEM FOR OBTAINING LEADS BASED ON DATA DERIVED FROM A VARIETY OF SOURCES

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 379 days.

(21) Appl. No.: 14/576,955

(22) Filed: Dec. 19, 2014

Related U.S. Application Data (60) Provisional application No. 61/922,132, filed on Dec. 31, 2013.

(51) Int. Cl.
*G06Q 30/02* (2012.01)

(52) U.S. Cl.
CPC ................ *G06Q 30/0201* (2013.01)

(58) Field of Classification Search
None
See application file for complete search history.

(56) References Cited

U.S. PATENT DOCUMENTS

| | | | |
|---|---|---|---|
| 6,185,558 B1 | 2/2001 | Bowman et al. | |
| 6,236,977 B1 | 5/2001 | Verba et al. | |
| 6,571,951 B2 | 6/2003 | Levine et al. | |
| 7,047,206 B1 | 5/2006 | Schultze | |
| 7,228,284 B1 | 6/2007 | Vaillancourt et al. | |
| 7,275,083 B1 | 9/2007 | Seibel et al. | |
| 7,340,410 B1 | 3/2008 | Vaillancourt et al. | |
| 7,580,870 B1 | 8/2009 | Chang | |
| 8,805,734 B2 | 8/2014 | Diana et al. | |
| 2002/0035504 A1 | 3/2002 | Dyer et al. | |
| 2002/0082892 A1 | 6/2002 | Raffel et al. | |
| 2002/0128885 A1* | 9/2002 | Evans ................ | G06Q 10/06 705/7.29 |
| 2004/0143473 A1 | 7/2004 | Tivey et al. | |
| 2004/0143476 A1 | 7/2004 | Kapadia et al. | |
| 2004/0143482 A1 | 7/2004 | Tivey et al. | |
| 2004/0143483 A1 | 7/2004 | Tivey et al. | |
| 2004/0143484 A1 | 7/2004 | Kapadia et al. | |

(Continued)

FOREIGN PATENT DOCUMENTS

| | | | | |
|---|---|---|---|---|
| WO | 2007112411 A2 | 10/2007 | | |
| WO | WO 2007112411 A2 * | 10/2007 | ............. | G06Q 30/02 |

*Primary Examiner* — Matthew S Gart
*Assistant Examiner* — Akosua Kyereme-Tuah
(74) *Attorney, Agent, or Firm* — Eric L. Sophir; Dentons US LLP (57) ABSTRACT

A method and system for obtaining leads based on data derived from a variety of sources is disclosed. The method is executed by a system that includes a data processing module within a leads management system, among others system components. The data processing module scans one or more external data sources; collects lead data from those sources; analyzes the data collected; identifies attributes of interest about one or more potential quality leads; identifies one or more high quality leads; creates a profile for those high quality leads; stores those profiles in an internal database; and generates a list of one or more high quality leads.

20 Claims, 4 Drawing Sheets

(56) References Cited

U.S. PATENT DOCUMENTS

| | | |
|---|---|---|
| 2005/0125334 A1 | 6/2005 | Masella et al. |
| 2006/0041500 A1 | 2/2006 | Diana et al. |
| 2006/0155642 A1 | 7/2006 | Pettersen |
| 2006/0200360 A1 | 9/2006 | Razletovskiy |
| 2006/0265259 A1 | 11/2006 | Diana et al. |
| 2007/0027746 A1 | 2/2007 | Grabowich |
| 2007/0174108 A1 | 7/2007 | Monster |
| 2008/0201204 A1 | 8/2008 | Rose et al. |
| 2008/0201205 A1 | 8/2008 | Rose et al. |
| 2009/0234710 A1 | 9/2009 | Belgaied Hassine et al. |
| 2011/0153449 A1 | 6/2011 | Hite |
| 2011/0225082 A1 | 9/2011 | Diana et al. |
| 2012/0072232 A1 | 3/2012 | Frankham et al. |
| 2013/0006916 A1 | 1/2013 | McBride et al. |
| 2013/0054480 A1 | 2/2013 | Ross et al. |
| 2013/0085805 A1* | 4/2013 | Kursar ............... G06Q 30/0201 705/7.29 |
| 2014/0279722 A1* | 9/2014 | Singh ................ G06F 17/30702 706/11 |
| 2014/0289005 A1 | 9/2014 | Laing et al. |
| 2014/0324529 A1 | 10/2014 | Bliss |
| 2015/0154524 A1 | 6/2015 | Borodow et al. |
| 2016/0203498 A1 | 7/2016 | Das et al. |

* cited by examiner

METHOD AND SYSTEM FOR OBTAINING LEADS BASED ON DATA DERIVED FROM A VARIETY OF SOURCES

CROSS-REFERENCE TO RELATED APPLICATIONS

This application claims priority to U.S. Provisional Application Ser. No. 61/922,132, entitled "Method For Obtaining Leads Based on an Aggregation of a Variety of Sources," filed Dec. 31, 2013, which is hereby incorporated by reference in its entirety.

This application relates to U.S. Provisional Application No. 61/921,738, filed on Dec. 30, 2013, U.S. Provisional Application No. 61/922,139, filed Dec. 31, 2013, U.S. Provisional Patent Application Ser. No. 61/921,760, filed Dec. 30, 2013, U.S. patent application Ser. No. 61/921,752, filed Dec. 30, 2013, U.S. Provisional Patent Application Ser. No. 61/922,134, filed Dec. 31, 2013, and U.S. Provisional Patent Application Ser. No. 61/922,137, filed Dec. 31, 2013, all of which are hereby incorporated by reference in their entirety.

TECHNICAL FIELD

The present disclosure relates in general to a system and method for lead generation and more specifically, to a system and method for obtaining leads based on data derived from a variety of sources.

BACKGROUND

Companies generate leads from a variety of sources. Following up on such leads can result in successfully completing a transaction. Conventional strategies for generating leads include advertising, and referrals, and/or any other type of business generating strategy. However, these conventional strategies take a significant amount of financial resources, and typically include time-consuming and very demanding tasks. In addition, these strategies limit the number of new leads generated and do not assure the quality of those leads. Establishing contact with a low quality lead that is not interested or financially ready to purchase a service and/or product may result in the inefficient use of an agent's time, efforts, and financial resources.

For the aforementioned reasons there is a need for a system and method for obtaining high quality leads in a more efficient manner.

SUMMARY

The present disclosure describes a method and system for obtaining leads based on data derived from a variety of sources. According to an embodiment, the method for obtaining leads may be executed through a computer-implemented system architecture that may include different components that dynamically interact with each other through network connections. In this embodiment, the system includes one or more external data sources, one or more internal databases, one or more leads management systems that include one or more data processing modules, among other software modules. Further to this embodiment, the system also includes any user interface to interact with agents by means of a computing device. The computing device is any computer type device that receives, processes, and/or transmits digital data. The computing device includes a bus which enables the communication between components such as input/output devices, one or more interfaces, one or more memories, one or more storage devices and one or more central processing units, among other system components.

According to another embodiment, a computer-implemented method for obtaining leads based on data derived from a variety of sources comprises receiving, by the computer, a selection from a user interface of a computer of an agent of a category of lead information, an attribute of the category, and a desired threshold range of the attribute of the category; querying, by the computer, records of an external data source to obtain lead information; collecting, by a computer, from the external data source, lead information related to one or more leads; classifying, by the computer, lead information into categories of lead information; filtering, by the computer, the lead information to obtain a set of filtered lead information comprising only leads with the selected attribute; assigning, by the computer, a value associated with each selected attribute; determining, by the computer, a score based on averaging the values associated with each selected attribute; determining, by the computer, if the score exceeds a minimum threshold and when the score exceeds the minimum threshold: creating, by the computer, a profile for the lead having a score that exceeds the minimum threshold; automatically storing, by the computer, in an internal database, the lead having the score that exceeds the minimum threshold; and automatically providing, by the computer, for display on the user interface of the agent's computer the lead having the score that exceeds the minimum threshold.

According to yet another embodiment, a system for obtaining leads based on data derived from of a variety of sources comprises a computer processor; a memory containing a program that, when executed by the computer processor, is configured to perform an operation comprising: receiving, by the computer processor, a selection from a user interface of a computer of an agent of a category of lead information, an attribute of the category, and a desired threshold range of the attribute of the category; querying, by the computer processor, records of an external data source to obtain lead information; collecting, by a computer processor, from the external data source, lead information related to one or more leads; classifying, by the computer processor, lead information into categories of lead information; filtering, by the computer processor, the lead information to obtain a set of filtered lead information comprising only leads with the selected attribute; assigning, by the computer processor, a value associated with each selected attribute; determining, by the computer processor, a score based on averaging the values associated with each selected attribute; determining, by the computer processor, if the score exceeds a minimum threshold and when the score exceeds the minimum threshold: creating, by the computer processor, a profile for the lead having a score that exceeds the minimum threshold; automatically storing, by the computer processor, in an internal database, the lead having the score that exceeds the minimum threshold; and automatically providing, by the computer processor, for display on the user interface of the agent's computer the lead having the score that exceeds the minimum threshold.

The method and system disclosed here leverages rich information derived from a plurality of unconventional sources of information, to identify a higher number of quality leads that are interested and financially ready to purchase a service and/or product. In addition, the method and system enables an automated identification of new quality leads in a simpler, less time-consuming and inexpensive way, while increasing the company's revenue. Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

As used here, the following terms may have the following definitions:

"Agent" refers to an individual working for a company with an interest in obtaining one or more high quality leads. An agent may represent the intermediary between an issuing company and a client.

"Leads" refers to the contact information and other information concerning an entity that may have the interest and authority to purchase a product or service.

"Quality" refers to the specific attributes of a lead that may create value for a company. Example of such attributes may include the propensity of a lead to close a deal transaction and the potential profit that the transaction may generate.

DETAILED DESCRIPTION

The present disclosure is described in detail with reference to implementations, which form a part here. Other implementations may be used and/or other changes may be made without departing from the spirit or scope of the present disclosure. The illustrative implementations described in the detailed description are not meant to be limiting of the subject matter presented here.

The present disclosure describes a method for obtaining leads based on data derived from a variety of sources. According to an embodiment, a computer-implemented method for obtaining leads includes the steps of scanning one or more external data sources, collecting data from those external data sources, analyzing the collected data, identifying attributes of interest about leads, identifying one or more high quality leads, creating the profile of those previously identified high quality leads, storing those profiles in an internal database, and generating a list of one or more high quality leads.

Figure 1:
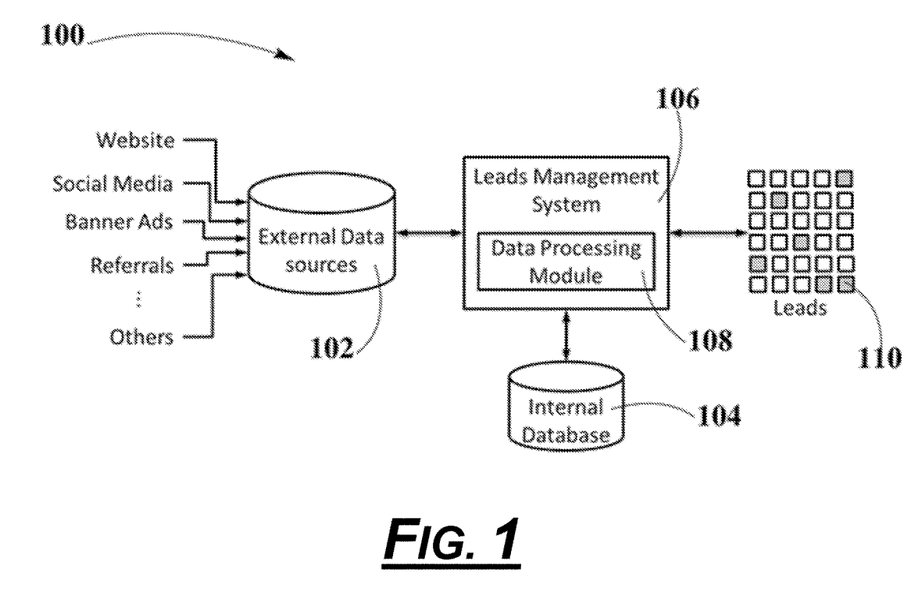
FIG. 1 is a block diagram illustrating an exemplary system architecture for obtaining high quality leads, according to an embodiment.

FIG. 1 is a block diagram illustrating an exemplary system architecture for obtaining high quality leads, according to an embodiment. In FIG. 1, the disclosed system architecture 100 includes different components which dynamically interact with one another through network connections (not shown in FIG. 1). Network connections refer to any connection between computers such as, for example, intranets, local area networks (LANs), virtual private networks (VPNs), wide area networks (WANs) and/or the internet, among others.

According to some embodiments, system architecture 100 includes one or more external data sources 102, one or more internal databases 104, one or more client computing devices (not shown in FIG. 1) and a plurality of servers (not shown in FIG. 1) having the necessary hardware and software to implement the aforementioned system components, among others. Examples of firmware and/or hardware and associated software enabling functionality of the aforementioned system components will be further described in FIG. 2, below.

In these embodiments, external data sources 102 include personal information about leads. Lead information includes identity, age, ethnicity, place of residence, number and identity of dependent persons (e.g. children, dependent adults), expenditure, savings, approximate market value of assets and their composition, education, professional situation, contact information, shopping and travel preferences, hobbies, social activities, active lifestyle, online behavioral patterns, and/or medical and health records, among others. Examples of external data sources 102 include websites, social media and networks, banner ads, online shopping, catalog purchases, and/or referrals, among others. In an embodiment, external data sources 102 also include data gathering companies. Further to these embodiments, internal database 104 stores information derived from one or more software modules operating within a leads management system 106. In these embodiments, external data sources 102 and internal database 104 grants access to leads management system 106 when needed. Further to these embodiments, external data sources 102 and internal database 104 can be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data.

Lead data is derived from external data sources 102 using a variety of techniques. In some embodiments, the lead data is compiled by crawling web documents and extracting the desired information from the documents. Web documents include any document that can be accessed via a search program. Example web documents include text documents, images, pod-casts, videos, audio files, programs, instant messages, text messages, and/or other electronic documents. Web documents include opinion-based documents including reviews, blogs, forum posts, and/or other documents where opinions are cited.

In some embodiments, a search program crawls through web documents to compile lead data. The search program learns about a lead by analyzing a first set of documents and extracting lead data including any inferences that can be made. In these embodiments, an inference engine provides a set of rules and/or other criteria that are used to determine whether or not an inference should be made and stored to a lead information database. For example, the inference engine uses one or more of the following logic systems: artificial intelligence systems, fuzzy logic algorithms, neural network pattern matching, genetic algorithms, expert system logic, and/or other computer based decision-making and/or pattern matching based systems, to determine when a given set of one or more data elements should be inferred and stored to the lead profile.

In some embodiments, leads management system 106 is operatively coupled to external data sources 102 and internal database 104 through network connections. In these embodiments, leads management system 106 includes one or more data processing modules 108, among other software modules. Further to these embodiments, each software module operating within leads management system 106 includes a processing unit for running related algorithms or computer executable program instructions that are executed by a server, a single computer, or multiple computers within a distributed configuration. These software modules are configured to interact with one or more software modules of the same or different type operating within leads management system 106. In these embodiments, the processing unit includes a processor with a computer-readable medium, such as a random access memory (RAM) coupled to the processor. Examples of processor types include a microprocessor, an application specific integrated circuit (ASIC), and a field programmable object array (FPOA), among others.

In these embodiments, data processing module 108 and other software modules within leads management system 106 generate a user interface on which a user, such as an agent, interacts with system architecture 100 by means of a computing device. Examples of computing devices include smartphones, desktop computers, laptop computers, tablets, and PDAs, and/or other type of processor-controlled device that can receive, process and/or transmit digital data. Further to these embodiments, user interface is configured to collect lead information from one or more external data sources 102, and one or more internal databases 104. In these embodiments, user interface is also configured to receive and/or provide information to one or more users, through the interaction with one or more computing devices via an input/output (I/O) device such as, a touch screen or a mouse, a keyboard and/or a keypad working in concert with a display, and others. In some embodiments, data processing module 108 generates additional user interfaces on client computing device that may correspond to tasks not specific to the applications described herein.

In an embodiment, the lead is a potential new customer and/or a group of potential new customers. The group of potential new customers can be bundled together based on similar attributes, lead information, categories, and/or any other relevant information. In this embodiment, the lead information can be placed into one or more categories of lead information comprising of: floor price, geography, demographics, purchase behavior, purchase history and/or any other relevant category.

In some embodiments, data processing module 108 operating within leads management system 106 collects and analyses lead data derived from external data sources 102 to identify one or more high quality leads 110 employing data mining and machine learning techniques. In these embodiments, data processing module 108 generates a profile for each high quality lead 110 identified and stores these profiles in internal database 104.

Figure 2:
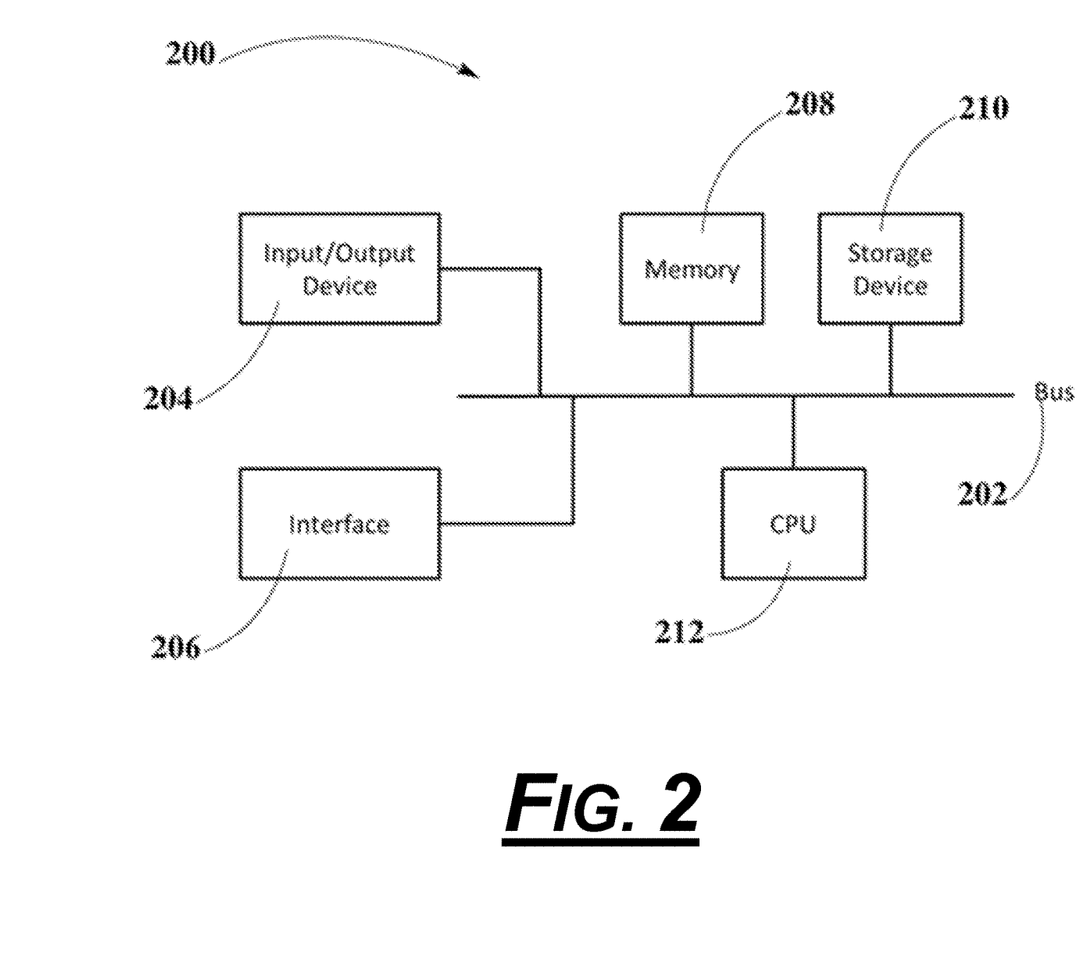
FIG. 2 is a block diagram illustrating an exemplary computing device or server in which one or more embodiments of the present disclosure operate.

FIG. 2 is a block diagram illustrating an exemplary computing device in which one or more embodiments of the present disclosure may operate. In FIG. 2, computing device 200 includes bus 202, input/output (I/O) device 204, communication interface 206, memory 208, storage device 210 and central processing unit (CPU) 212. In some embodiments, computing device 200 includes additional, fewer, different, or differently arranged components than those illustrated in FIG. 2.

In FIG. 2, bus 202 is in physical communication with I/O device 204, communication interface 206, memory 208, storage device 210 and central processing unit 212. Bus 202 includes a path that permits components within computing device 200 to communicate with each other. Examples of I/O device 204 include any peripheral and/or other mechanisms that enable a user to input information to computing device 200 such as, for example, a keyboard, a computer mouse, a track ball, other input buttons, touch screens, voice recognition devices, biometric mechanisms devices and the like. I/O device 204 also includes a mechanism that outputs information to the user of computing device 200 such as, for example, a display, a light emitting diode (LED), a printer, a speaker and the like.

In FIG. 2, communication interface 206 is a device that enables computing device 200 to communicate with other computing devices and/or systems through network connections (not shown in FIG. 2), such as, for example, Wi-Fi cards, Ethernet and the like. Network connections refer to any network connection between computers that allows computing device 200 to exchange data, such as, for example, intranets, local area networks (LANs), virtual private networks (VPNs), wide area networks (WANs), the internet and the like. Memory 208 is a device that stores software programs or data used in computing device 200, such as, for example, random access memory (RAM), read-only memory (ROM), flash memory and the like. Storage device 210 is a device that stores and retrieves information, such as, for example, magnetic and/or optical recording medium, Ferro-electric RAM (F-RAM) hard disks, solid-state drives, floppy disks, optical discs and the like. In one embodiment, memory 208 and storage device 210 store information and instructions for execution by one or more central processing units 212. Examples of central processing units 212 include a microprocessor, an application specific integrated circuit (ASIC), a field programmable object array (FPOA), and the like. In this embodiment, central processing unit 212 interprets and executes instructions retrieved from memory 208 and storage device 210.

In some embodiments, computing device 200 can be implemented as part of a server, a client computing device and the like, such as data processing module 108 in system architecture 100 of FIG. 1. Examples of implementations of computing device 200 include servers, authorized client computing devices, smartphones, desktop computers, laptop computers, tablet computers, PDAs and other types of processor-controlled devices that receive, process, and/or transmit digital data. In an example, computing device 200 performs certain operations that are required for the proper operation of system architecture 100. Computing devices 200 perform these operations as a result of central processing unit 212 executing software instructions contained within a computer-readable medium, such as within memory 208.

In one embodiment, the software instructions of the system are read into memory 208 from another memory location, such as from storage device 210, or from another computing device 200 via communication interface 206. In this embodiment, the software instructions contained within memory 208 instructs central processing unit 212 to perform processes that will be further described in FIG. 3, below. Alternatively, hardwired circuitry may be used in place of or in combination with software instructions to implement the processes described herein. Thus, implementations described herein are not limited to any specific combinations of hardware circuitry and software.

Figure 3:
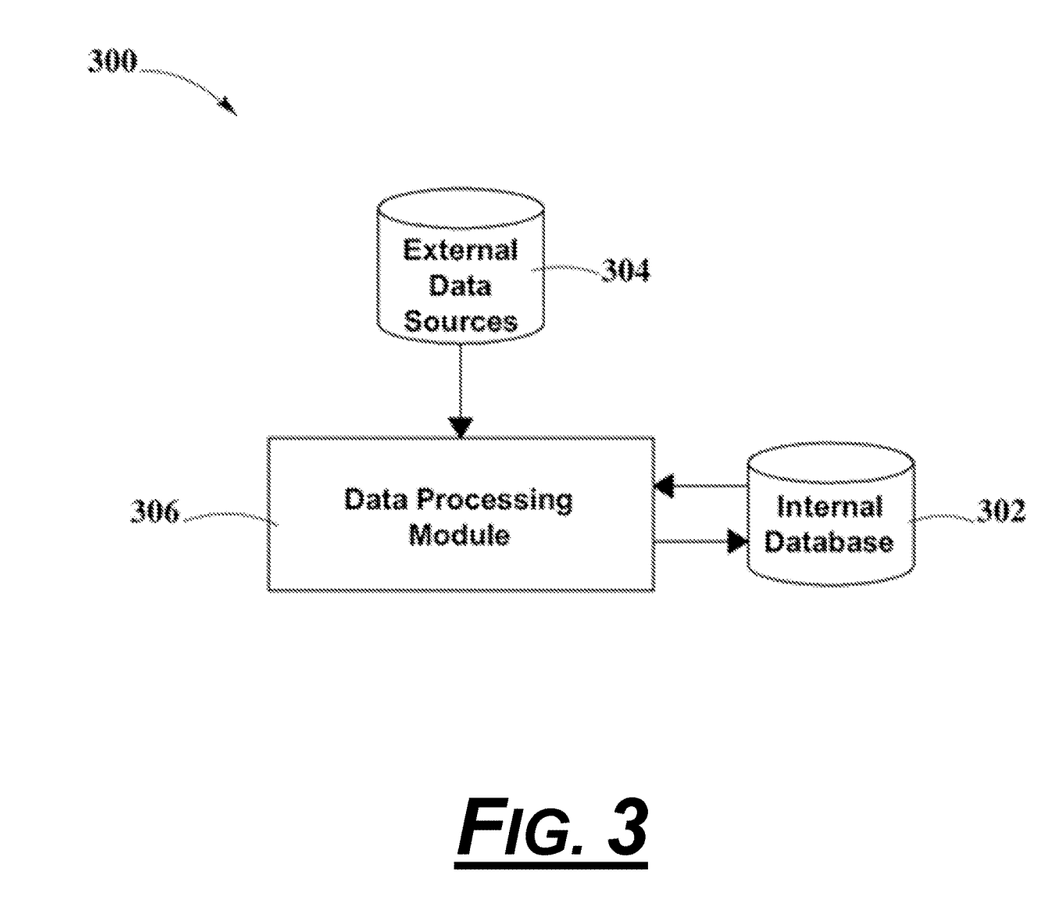
FIG. 3 is a block diagram illustrating an exemplary sub-system of a portion of a system architecture pertaining to a leads management system.

FIG. 3 is a block diagram illustrating an exemplary sub-system of a portion of system architecture 100 of FIG. 1. In some embodiments, sub-system 300 is implemented as a data processing module, such as, for example data processing module 108 described in system architecture 100 of FIG. 1. In FIG. 3, sub-system 300 includes internal database 302, external data sources 304 and data processing module 306. It should be understood that system architecture 100 can include less components, more components, or different components depending on the desired analysis goals. In an example referring to FIG. 1, data processing module 306 is implemented as data processing module 108 within system architecture 100. In FIG. 3, data processing module 306 is operatively coupled to and in communication with internal database 302 and external data sources 304.

In some embodiments, leads management system 306 is implemented as one or more computer software modules that include programmatic rules or logic for executing/running different user interfaces to identify one or more high quality leads. According to some embodiments, data processing module 306 collects and analyzes lead information derived from external data sources 304 to identify one or more leads. Examples of external data sources 304 include at least one of: websites, social media and networks, banner ads, online shopping, catalog purchases, referrals and/or any other relevant sources. In an embodiment, lead information includes identity, age, ethnicity, place of residence, number and identity of dependent persons (e.g. children, dependent adults), expenditure, savings, approximate market value of assets and their composition, education, professional situation, contact information, shopping and travel preferences, hobbies, social activities, active lifestyle, online behavioral patterns, and/or medical and health records, among others.

In some embodiments, the analysis of lead data and/or lead information allows data processing module 306, to determine if a lead meets certain attributes of value, falls within certain desired ranges, or if the data it includes is duplicate. In these embodiments, data processing module 306 identifies important information concerning one or more quality leads and their particular attributes which may imply value and propensity to close a deal transaction, using data mining, and other data processing tools. These particular attributes may include geography, demographics, income, economic stability, level of education, occupation, purchase behavior, channel by which the lead was identified, time since occurrence of life events, and/or reference potential, among others.

In some embodiments, data processing module 306 computes a value for each attribute. This value is determined based on a company's internal standards and/or categories and/or attributes searched by the agent. For example, the company can have minimum standards which must be met to consider pursuing a lead. In an embodiment, the company has particular attributes the company considers to be more valuable. For example, net worth of a lead can be considered a more valuable attribute, and a value may be generated by placing more weight on the net worth attribute. Similarly, an agent may set minimum standards which must be met to consider pursuing a lead. In some embodiments, the categories and attributes initially selected by the agent to search for a lead, causes the value for leads meeting those attributes to increase. For example, a lead within the geographic area of the agent may be given a higher value based on meeting search criteria of the agent.

In some embodiments, the values associated with the lead attributes are different depending on the attribute under analysis. Values can range from 1 to 30. In an embodiment, the value is assigned based on a predetermined table of values created by a company and/or the agent. In another embodiment, the value is assigned based on an internal company standard and/or an agent standard.

In some embodiments, added weight can be added to values. For example, if a lead meets particular categories the agent is searching and/or the company prefers, the value is multiplied by a factor of two and/or any other factor to provide additional weight. Attributes related to income level and/or financial assets and/or any other attribute representing a particular amount do not need the computation of a value as they may be expressed by a quantitative value representing a specific dollar amount. In an embodiment, these attributes may be given additional weight.

In some embodiments, after valuing each lead's attributes, data processing module 306 employs machine learning techniques such as naive bayes, logistic regression, support vector machine and/or random forest, among others for calculating a mean area under the receiver operator curve and/or area under curve (AUC) score. The mean AUC score describes the likelihood of a lead for converting into a customer.

In these embodiments, data processing module 306 generates a high quality lead by converting the value, information, interests and/or responses of each quality lead into profiles. In these embodiments, data processing module 306 stores in internal database 302, the profile of each high quality lead previously generated, including the particular attributes associated with each high quality lead. Further to these embodiments, the high quality lead profile can be available for further analysis performed by one or more software modules operating within data processing module 306. In one embodiment, data processing module 306 also includes one or more software modules configured to rank and auction leads to one or more agents.

Figure 4:
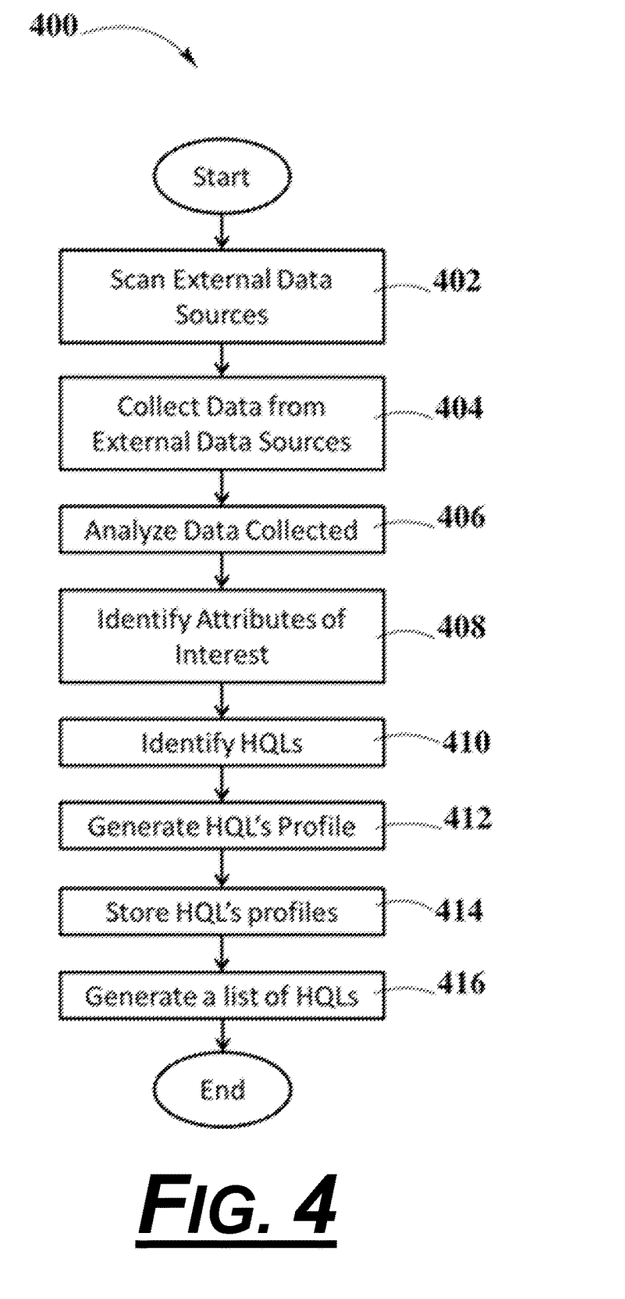
FIG. 4 is a flowchart of a method for obtaining high quality leads, according to an embodiment.

FIG. 4 is a flowchart of a method for obtaining high quality leads, according to an embodiment. In some embodiments, a data processing module operating within a leads management system receives a selection of attributes and threshold range from an agent, to identify one or more leads. In these embodiments, the data processing module scans a plurality of external data sources, collects lead information from these sources, and analyzes this lead information to compute a value associated with each lead attribute and identify one or more high quality leads. Further to these embodiments, the data processing module creates a profile for each high quality lead identified.

In FIG. 4, a plurality of steps included in method 400 are performed by one or more computing devices such as, for example, computing device 200 of FIG. 2, above. In FIG. 4, method 400 is implemented with components described in the exemplary operating environments of FIGS. 1-3. In some embodiments, the steps of method 400 are embodied in a computer readable medium containing a computer readable code such that the steps are implemented when the computer readable code is executed by a computing device. In other embodiments, certain steps of method 400 can be combined, performed simultaneously, or in a different order, without deviating from the objective of method 400.

Method 400 for obtaining quality leads starts at step 402, when a data processing module operating within a leads management system scans a plurality of external data sources. Examples of external data sources include at least one of: websites, social media and networks, banner ads, online shopping, catalog purchases, referrals and/or any other relevant sources. Method 400 then advances to step 404.

At step 404, the data processing module collects lead data from those external data sources previously scanned in step 402. In some embodiments, the data processing module collects lead data based on an agent's lead identification request including a desired lead information category, attributes of the category and any threshold range of the attribute. In an embodiment, collected lead data includes identity, age, ethnicity, place of residence, number and identity of dependent persons (e.g. children, dependent adults), expenditure, savings, approximate market value of assets and/or their composition, economic stability, education, professional situation, contact information, shopping and/or travel preferences, hobbies, social activities, active lifestyle, online behavioral patterns, medical and/or health records, and others. Method 400 then advances to step 406. At step 406, the data processing module analyzes the collected data associated with each lead to identify one or more potential high quality leads. The data processing module analyzes the lead collected data using data mining and/or other data processing tools. This analysis allows the data processing module to determine if a lead meets certain attributes of value defined by the company, falls within certain desired ranges defined by the company and/or if the lead data is duplicative. Method 400 then advances to step 408.

At step 408, the data processing module identifies one or more attributes of interest that may imply that a lead has value and propensity to close a deal transaction. These attributes of interest include geography, demographics, income, economic stability, level of education, occupation, purchase behavior, channel by which the lead was identified, time since occurrence of life events, and/or reference potential, among others. Method 400 then advances to step 410.

At step 410 if the data processing module identifies one or more attributes of interest within the collected data associated to a lead, then the lead is identified as a high quality lead. Method 400 then advances to step 412.

At step 412, the data processing module generates a high quality lead profile based on the information collected from external data sources in step 404 and analyzed in step 406. Method 400 then advances to step 414.

At step 414, the data processing module stores in an internal database, each high quality lead profile generated in step 412, to make it available for further analysis performed by one or more modules operating within the leads management system. Method 400 then advances to step 416.

At step 416, the data processing module generates a list of high quality leads with the high quality leads identified in step 410. The data processing module can display this list through a user interface by means of a computing device.

By executing method 400 through the exemplary operating environments shown in FIGS. 1-3, big data analytics, data mining and machine learning techniques can be implemented for a more efficient and faster processing of larger data sets. Big data analytics allows the financial institution to profile quality leads in a far-reaching manner than possible with human-intervention data-driven analysis. In this way, efficiencies are created by providing ways for improving the identification of quality leads and the sale of insurance products to those quality leads as compared to conventional processes employing established methodology. These features allow performing large work such as time consuming analysis in a more efficient manner than other approaches such as manual work performed by humans.

An example of the method described herein is disclosed below.

The Example refers to the quality leads that may be obtained employing the method described in FIG.4 which is implemented with components of the exemplary operating environments of FIGS. 1-3. A data processing module operating within a leads management system receives a request, from an agent, to identify high quality leads. Then, the data processing module scans a plurality of external data sources and analyzes the collected lead information, to identify particular attributes of interest that implies that a lead has value and propensity to close a deal transaction. For example, the data processing module identifies five high quality leads and generates a profile for each of those five high quality leads, using the information previously collected and analyzed. Data processing module can then store each created profile in an internal database to make it available for further analysis performed by one or more modules operating within the leads management system. The data processing module can also generate a list of the five leads identified, and display this list to one or more agents via a user interface through a computing device.

The foregoing method descriptions and the interface configuration are provided merely as illustrative examples and are not intended to require or imply that the steps of the various implementations must be performed in the order presented. As will be appreciated by one of skill in the art the steps in the foregoing implementations may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the implementations disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be applied in software, firmware, middleware, microcode, hardware description languages, or any combination thereof. A code segment or machine-executable instructions may represent a procedure, a function, a subprogram, a program, a routine, a subroutine, a module, a software package, a class, and/or any combination of instructions, data structures, program statements and/or any other type of code segment. A code segment may be coupled to another code segment or a hardware circuit by passing and/or receiving information, data, arguments, parameters, and/or memory contents. Information, arguments, parameters, data, and/or any other relevant information may be passed, forwarded, and/or transmitted via any means including memory sharing, message passing, token passing, and/or network transmission.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, such non-transitory processor-readable media may comprise RAM, ROM, EEPROM, CD-ROM and/or other optical disk storage, magnetic disk storage and/or other magnetic storage devices, and/or any other tangible storage medium that may be used to store desired program code in the form of instructions or data structures and that may be accessed by a computer and/or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination and/or set of codes and/or instructions on a non-transitory processor-readable medium and/or computer-readable medium, which may be incorporated into a computer program product.

The preceding description of the disclosed implementations is provided to enable any person skilled in the art to make or use the present invention. Various modifications to these implementations will be readily apparent to those skilled in the art, and the generic principles defined here may be applied to other implementations without departing from the spirit or scope of the invention. Thus, the present invention is not intended to be limited to the implementations shown here but is to be accorded the widest scope consistent with the following claims and the principles and novel features disclosed here.

What is claimed is:

1. A computer-implemented method comprising:
receiving, by the computer, a request to identify a first set of leads and a selection from a user interface of a computer of a user, wherein the selection comprises a category of lead information corresponding to the first set of leads, a set of attributes of the category, and a desired threshold range of an attribute of the category;
querying, by the computer, an internal database to identify the first set of leads corresponding to the received category of lead information and the set of attributes that satisfy the desired threshold, wherein the internal database is configured to store lead profiles corresponding to the first set of leads and their attributes;
upon querying the internal database, receiving, by the computer, the first set of leads corresponding to the received category of lead information and the set of attributes that satisfy the desired threshold;
querying, by the computer, based on the category and the set of attributes received from the user, records of an external data source to obtain lead information, wherein the external data source comprises at least an external database;
compiling, by a computer, from the external data source, lead information related to a second set of leads, wherein the lead information is compiled by:
web-crawling one or more social networking web documents associated with the second set of leads within the external database,
extracting the lead information comprising one or more characteristic values from the one or more social networking web documents, and
transmitting the one or more characteristic values to an inference engine, wherein the inference engine generates one or more inferences associated with the second set of leads,
wherein the generated inferences comprise additional attributes inferred, by the inference engine applying the set of attributes received from the user and the one or more characteristic values extracted from the one or more social networking web documents to a computer-generated artificial intelligence model utilizing a neural network pattern matching algorithm and configured to derive inferences based on previously considered, collected, and analyzed lead data;
determining, by the computer, a subset of the lead information related to the second set of leads that satisfies the desired threshold range received from the user interface;
assigning, by the computer, a value associated with each attribute of the selected attributes and the inferred additional attributes, wherein each attribute is associated with a weight indicating an importance level of the attribute based on criteria and standards received from the user interface, and wherein the value is determined based on the weight;
determining, by the computer, a score based on averaging the values associated with each attribute;
upon the score satisfying a minimum threshold:
generating, by the computer, in the internal database, a profile for the lead having a score that satisfies the minimum threshold;
automatically storing, by the computer, in the internal database, the lead having the score that satisfies the minimum threshold; and
automatically displaying, by the computer, on the user interface of the user's computer, the first set of leads and the second set of leads having the score that satisfies the minimum threshold.

2. The method according to claim 1, wherein the lead information comprises at least one of: identity, age, ethnicity, place of residence, number of dependent persons, identity of dependent persons, expenditure, savings, approximate market value of assets and their composition, education, professional situation, contact information, shopping preferences, travel preferences, hobbies, social activities, active lifestyle, online behavioral patterns, medical and health records.

3. The method according to claim 1, wherein the categories of lead information comprises at least one of: floor price, geography, demographics, purchase behavior, and purchase history.

4. The method according to claim 1, wherein the category is one or more categories of lead information.

5. The method of claim 1, wherein the lead is a potential new customer.

6. The method of claim 1, wherein the lead is a group of potential new customers.

7. The method of claim 6, wherein the group of potential new customers is associated with an attribute of a category.

8. The method of claim 1, wherein the external data source comprises at least one of: websites, banner ads, online shopping, catalog purchases, and referrals.

9. The method of claim 1, wherein the value is assigned based on a predetermined table of values.

10. The method of claim 1, wherein the value is assigned based on an internal company standard.

11. A system comprising:
a computer processor;
a memory containing a program that, when executed by the computer processor, is configured to perform an operation comprising:
receive a request to identify a first set of leads and a selection from a user interface of a computer of a user, wherein the selection comprises a category of lead information corresponding to the first set of leads, a set of attributes of the category, and a desired threshold range of an attribute of the category;
query an internal database to identify the first set of leads corresponding to the received category of lead information and the set of attributes that satisfy the desired threshold, wherein the internal database is configured to store lead profiles corresponding to the first set of leads and their attributes;
upon querying the internal database, receive the first set of leads corresponding to the received category of lead information and the set of attributes that satisfy the desired threshold;
query, based on the category and the set of attributes received from the user, records of an external data source to obtain lead information, wherein the external data source comprises at least an external database;
compile, from the external data source, lead information related to a second set of leads, wherein the lead information is compiled by:
web-crawling one or more social networking web documents associated with the second set of leads within the external database,
extracting the lead information comprising one or more characteristic values from the one or more social networking web documents, and
transmitting the one or more characteristic values to an inference engine, wherein the inference engine generates one or more inferences associated with the leads using the lead information compiled,
wherein the generated inferences comprise additional attributes inferred, by the inference engine applying the set of attributes received from the user and the one or more characteristic values extracted from the one or more social networking web documents to a computer-generated artificial intelligence model utilizing a neural network pattern matching algorithm and configured to derive inferences based on previously considered, collected, and analyzed lead data;
determine, by the computer, a subset of the lead information related to the second set of leads that satisfies the desired threshold range received from the user interface;
assign a value associated with each attribute of the selected attributes and the inferred additional attributes, wherein each attribute is associated with a weight indicating an importance level of the attribute based on criteria and standards received from the user interface; and wherein the value is determined based on the weight;
determine a score based on averaging the values associated with each selected attribute;
upon the score satisfying a minimum threshold:
generate in the internal database, a profile for the lead having a score that satisfies the minimum threshold;
automatically store in the internal database, the lead having the score that satisfies the minimum threshold; and
automatically display, by the computer, on the user interface of the user's computer the first set of leads and the second set of leads having the score that satisfies the minimum threshold.

12. The system according to claim 11, wherein the lead information comprises at least one of: identity, age, ethnicity, place of residence, number of dependent persons, identity of dependent persons, expenditure, savings, approximate market value of assets and their composition, education, professional situation, contact information, shopping preferences, travel preferences, hobbies, social activities, active lifestyle, online behavioral patterns, medical and health records.

13. The system according to claim 11, wherein the categories of lead information comprises at least one of: floor price, geography, demographics, purchase behavior, and purchase history.

14. The system according to claim 11, wherein the category is one or more categories of lead information.

15. The system of claim 11, wherein the lead is a potential new customer.

16. The system of claim 11, wherein the lead is a group of potential new customers.

17. The system of claim 16, wherein the group of potential new customers is associated with an attribute of a category.

18. The system of claim 11, wherein the external data source comprises at least one of: websites, banner ads, online shopping, catalog purchases, and referrals.

19. The system of claim 11, wherein the value is assigned based on a predetermined table of values.

20. The system of claim 11, wherein the value is assigned based on an internal company standard.

* * * * *